US012704846B2

(12) United States Patent
Rust et al.

(10) Patent No.: US 12,704,846 B2
(45) Date of Patent: Aug. 11, 2026

(54) SYSTEM FOR SYNCING A HARVESTER WITH AN AUTONOMOUS GRAIN CART

(71) Applicant: Raven Industries, Inc., Sioux Falls, SD (US)

(72) Inventors: Matthew K. Rust, Chandler, AZ (US); Joel Jared Kocer, Valley Springs, SD (US); Matthew Michael Rottinghaus, Scottsdale, AZ (US); Koby Kevin Jackson, Sioux Falls, SD (US); Jacob David Deines, Brandon, SD (US); Brandon Joseph Roth, Parker, SD (US); Gustavo de Almeida Martins, Chandler, AZ (US); Alex John Weidenbach, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 165 days.

(21) Appl. No.: 18/356,828

(22) Filed: Jul. 21, 2023

(65) Prior Publication Data

US 2024/0028048 A1 Jan. 25, 2024

Related U.S. Application Data

(60) Provisional application No. 63/369,127, filed on Jul. 22, 2022.

(51) Int. Cl.
*G05D 1/00* (2024.01)
*A01D 41/02* (2006.01)

(52) U.S. Cl.
CPC ........... *G05D 1/0287* (2013.01); *A01D 41/02* (2013.01); *G05D 1/0088* (2013.01); *G05D 1/0278* (2013.01)

(58) Field of Classification Search
CPC .. G05D 1/0287; G05D 1/0088; G05D 1/0278; G05D 1/248; G05D 1/6985;
(Continued)

(56) References Cited

U.S. PATENT DOCUMENTS 8,606,454 B2 12/2013 Wang et al.
10,788,821 B2 9/2020 Matsuzaki et al.
(Continued)

FOREIGN PATENT DOCUMENTS

AU 2011359328 6/2015
EP 1315980 B1 * 10/2006 ........... G01S 13/931
(Continued)

OTHER PUBLICATIONS

Leibson, "Use IMUs for Precise Location Data When GPS Won't Suffice", https://www.digikey.com/en/articles/use-imus-for-precise-location-data-when-gps-wont-suffice (Year: 2018).*
(Continued)

*Primary Examiner* — Hitesh Patel
*Assistant Examiner* — Shien Ming Chou
(74) *Attorney, Agent, or Firm* — Schwegman Lundberg & Woessner, P.A.

(57) ABSTRACT

A control system includes a first input to receive a positional output characteristic of a first vehicle at a first communication frequency and a second input to receive a kinematic output characteristic of the first vehicle at a second frequency, where the second frequency is greater than the first frequency. A guidance controller of a second vehicle is configured to process the kinematic output characteristic of the first vehicle to obtain a heading of the first vehicle, compare the heading of the first vehicle with a heading of the second vehicle to obtain a heading deviation of the second vehicle, and determine a guidance heading of the second vehicle based on the heading deviation of the second
(Continued)

vehicle. A control interface is configured to communicate the guidance heading to one or more of steering, throttle or brake elements of the second vehicle.

26 Claims, 8 Drawing Sheets

(58) Field of Classification Search
CPC ........... G05D 2105/15; G05D 2107/21; G05D 2109/10; G05D 1/695; A01D 41/02
USPC ........................................................... 701/50
See application file for complete search history.

(56) References Cited

U.S. PATENT DOCUMENTS

| | | | |
|---|---|---|---|
| 10,890,922 B2 | 1/2021 | Ramm et al. | |
| 11,206,050 B2 | 12/2021 | Luo et al. | |
| 2021/0026362 A1 | 1/2021 | Wilson et al. | |
| 2021/0333802 A1* | 10/2021 | Singh | B60W 10/04 |
| 2022/0197302 A1 | 6/2022 | Mcclelland et al. | |

FOREIGN PATENT DOCUMENTS

| | | | |
|---|---|---|---|
| EP | 1903306 A2 * | 3/2008 | G01C 21/165 |
| WO | 2024020208 | 1/2024 | |

OTHER PUBLICATIONS

Zhang, "Leader-follower system using two robot tractors to improve work efficiency", Computer and Electronics in Argriculture, vol. 121, Feb. 2016, p. 269-281 (Year: 2016).*
"International Application Serial No. PCT US2023 028373, International Search Report mailed Oct. 10, 2023", 5 pgs.
"International Application Serial No. PCT US2023 028373, Written Opinion mailed Oct. 10, 2023", 6 pgs.
"Australian Application Serial No. 2023311016, First Examination Report mailed Oct. 31, 2025", 4 pgs.
"Australian Application Serial No. 2023311016, Response filed Feb. 3, 2026 to First Examination Report mailed Oct. 31, 2025", 80 pgs.
"Canadian Application Serial No. 3,261,985, Examiners Rule 862 Report mailed Feb. 3, 2026", 4 pgs.
"Australian Application Serial No. 2023311016, First Examination Report mailed Feb. 27, 2026", 4 pgs.

* cited by examiner

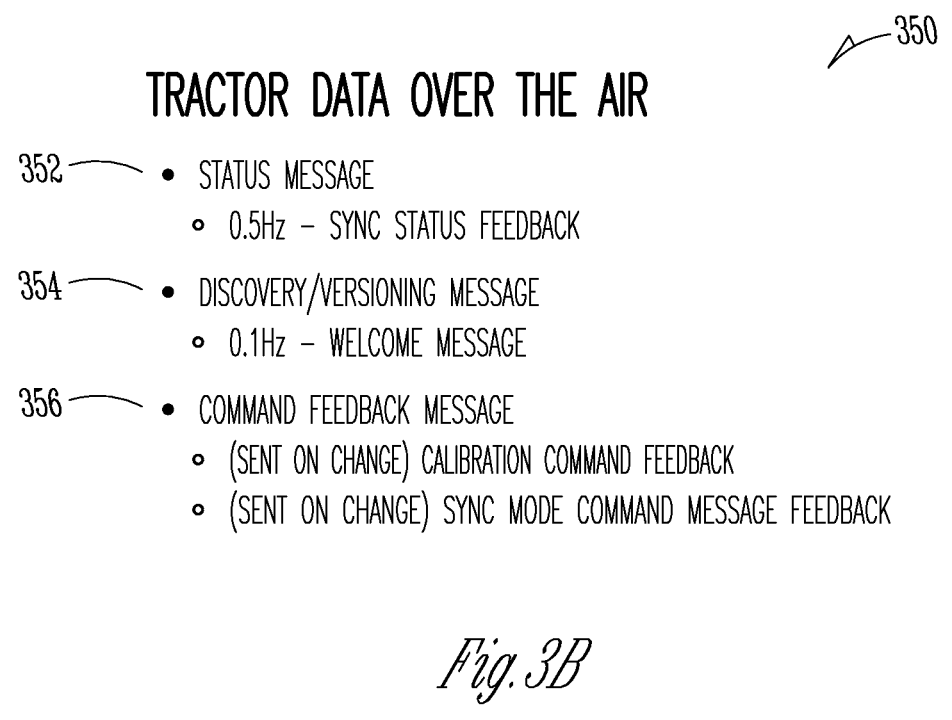

350

TRACTOR DATA OVER THE AIR

352 • STATUS MESSAGE
  ∘ 0.5Hz – SYNC STATUS FEEDBACK

354 • DISCOVERY/VERSIONING MESSAGE
  ∘ 0.1Hz – WELCOME MESSAGE

356 • COMMAND FEEDBACK MESSAGE
  ∘ (SENT ON CHANGE) CALIBRATION COMMAND FEEDBACK
  ∘ (SENT ON CHANGE) SYNC MODE COMMAND MESSAGE FEEDBACK

*Fig. 3B*

SYSTEM FOR SYNCING A HARVESTER WITH AN AUTONOMOUS GRAIN CART

CLAIM OF PRIORITY AND INCORPORATION BY REFERENCE

This patent application claims the benefit under 35 U.S.C. § 119(e) of U.S. Provisional Patent Application 63/369,127, filed Jul. 22, 2022, the disclosure of which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc. of Sioux Falls, South Dakota, USA. All Rights Reserved.

TECHNICAL FIELD

This document pertains generally, but not by way of limitation, to guidance of agricultural vehicles based on communication with other agricultural vehicles.

BACKGROUND

Agricultural vehicles conduct various operations in fields. In some examples vehicles conduct cooperative operations. For instance, a mower cuts hay into windrows as a first operation, and a companion baler collects and bales the cut and dried hay as a second operation. In other examples, a first vehicle conducts a first operation, such as harvesting by a combine, and a second vehicle (such as a companion grain cart) is driven proximate to the first vehicle to collect the harvested crop as a second operation, for instance from an auger spout. In practice the operator of the companion (second) vehicle observes the position of the output of the first vehicle, such as the windrows, auger spout or the like and guides the companion vehicle to collect the crop (e.g., windrows, crop from an auger spout or the like) and conduct the second operation. The operator applies a combination of knowledge regarding operation of the first and second vehicles and the operations conducted (e.g., knowhow) along with the observed positions of the vehicles to conduct guidance.

In other examples, a first vehicle conducts a first operation in a field, such as mowing. The first vehicle or an associated device, such as a GPS sensor, indexes the location of the first vehicle while conducting the first operation. Upon completion of the first operation (e.g., mowing of a field) the indexed locations of the first vehicle are bundled and submitted to a derivation system to generate a guidance line bundle for a second vehicle. For instance, the indexed locations of the first vehicle appear as indexed points in a field that form serpentine lines or polygons when connected that represent the first operation. These bundled locations are received after the first operation by the derivation system and the derivation system generates a guidance line bundle for the second vehicle based on the completed first operation. The second vehicle receives the guidance line bundle and uses the guidance line bundle to conduct the second operation, for instance autonomously or semi-autonomously.

SUMMARY

The present inventors have recognized, among other things, that a problem to be solved can include the indexed locations of a first vehicle (including one or more preceding vehicles) are poor representations for guidance of a second (companion) vehicle (including a plurality of companion vehicles). The companion vehicle (or vehicles) is often guided by an operator observing the output of the first agricultural vehicle, such as the crop (e.g., windrow, auger spout or the like). The indexed locations of the first agricultural vehicle (or vehicles), in contrast to the crop, are insufficient to guide the companion vehicle in a manner that facilitates conducting of the second operation. For example, indexed locations provide a general impression of first vehicle travel without further information including the heading of the first vehicle. Instead, the operator observes the heading of the first vehicle and refines guidance of the companion vehicle relative to the first vehicle. Accordingly, autonomous or semi-autonomous control systems rely on operator observation and input to refine control relative to indexed locations of the first vehicle.

The indexed locations of the first vehicle are, in some examples, insufficient for autonomous guidance of a second (companion) vehicle. As noted above, the indexed locations of the first vehicle do not include heading information, change in heading of the first vehicle or the like. Accordingly, a companion vehicle in some examples is not aligned to the first vehicle even when it follows the indexed locations of the first vehicle. Instead, heading of the companion vehicle varies relative to the first vehicle, and in an example including offloading of a crop from a combine (a first vehicle), misalignment may cause poor filling of a grain cart (a second vehicle), spilling of crops from the combine or the like.

The indexed locations of the first vehicle when used by the companion vehicle (having its own characteristics, such as heading, change in heading or the like) for guidance may inaccurately position the agricultural implement of the companion vehicle, such as a grain cart, relative to the agricultural output (e.g., windrows, auger spout or the like). For instance, the companion vehicle, operating autonomously or semi-autonomously, fails to accurately align its implement with the agricultural output, and in various examples a crop is not fully gathered from a windrow (e.g., for baling), a crop is not accurately received within a grain cart from an auger spout, a hay bale is weighted toward one end and less dense at the opposed end or the like. In still other examples, indexed positions of the first vehicle without heading information permit unintended navigation of the first and second vehicles toward each other, possibly colliding, because heading information (including changes in heading) is not communicated.

In still other examples, indexed locations of preceding (first) agricultural vehicles are in some examples bundled (after completion of the first operation) and relayed to intermediate derivation systems. The derivation system derives a guidance line bundle for a later operating second companion vehicle (e.g., sometimes hours, days or months after the first operation) to follow. The derivation system uses the indexed positions of the first vehicle along with estimated positions of agricultural implements and corresponding output (e.g., wind rows from a mower or a rake;

offset for an auger spout from a combine or the like) to generate the guidance line bundle. However, bundled locations fail to include information regarding the heading of the first vehicle to facilitate cooperative control of the companion vehicle.

Further, it takes time (in some examples hours or days) to generate the guidance lines for the bundle, for instance the first operation of the first vehicle is completed, and then the indexed locations from the first operation are bundled, submitted, and processed to derive the bundled guidance lines for the second vehicle. Depending upon the turnaround for derivation of the bundled guidance lines the delay may be significant (e.g., days, weeks or longer). This delay restricts the possibility of using a heading change of the first vehicle to permit responsive guidance of a companion vehicle.

Additionally, if the bundled guidance lines fail to accurately correspond with the position of the output from the first agricultural vehicle the companion vehicle will suffer from the issues noted above, including inaccurate alignment of the companion vehicle implement to the preceding output of the first vehicle. Instead of providing autonomous control, operator interruption and refinement of autonomous control may be required to align the vehicles, avoid collisions or the like. Thus, using bundled control may inhibit the ability to autonomously control a second vehicle based on heading and heading change of a first vehicle.

The present subject matter can help provide a solution to this problem with a control system that guides one or more second (companion) vehicles based on information received from one or more first vehicles. In various embodiments, the first vehicle includes, but is not limited to, a prime mover such as a combine, tractor, sprayer, vehicle and implement train or the like. In various embodiments, the second vehicle includes, but is not limited to, a tractor with a grain cart, a second combine, a sprayer, a baler or the like.

The system may include a first input to receive a positional output characteristic of a first vehicle at a first communication frequency and a second input to receive a kinematic output characteristic of the first vehicle at a second frequency, where the second frequency is greater than the first frequency. A guidance controller of a second vehicle is configured to process the kinematic output characteristic of the first vehicle to obtain a heading of the first vehicle, compare the heading of the first vehicle with a heading of the second vehicle to obtain a heading deviation of the second vehicle, and determine a guidance heading of the second vehicle based on the heading deviation of the second vehicle. A control interface is configured to communicate the guidance heading to driving elements of the second vehicle.

In various embodiments, the system is configured to use the positional output characteristic of the first vehicle to obtain a position of the first vehicle, and compare the position of the first vehicle to a position of the second vehicle to obtain a position deviation of the second vehicle. According to various embodiments, the system is configured to determine an approach speed of the second vehicle graduated based on the position deviation of the second vehicle, and communicate the approach speed of the second vehicle to the one or more of steering, throttle or brake elements of the second vehicle. In various examples, the difference in position between the first vehicle and the second vehicle may be used to control speed of the second vehicle. For instance, the greater the difference in position between the first vehicle and the second vehicle, the greater the speed input to the driving elements of the second vehicle.

In some examples, speed of the second vehicle is received via a controller area network (CAN) bus, and may be based on transmission speed, wheel speed or global positioning system (GPS) speed. In other examples, speed of the second vehicle is received via a GPS system. In one example, if the position of the second vehicle is relatively close to the first vehicle, the second vehicle is controlled to approach the first vehicle at a lesser speed until the second vehicle reaches the desired position with respect to the first vehicle, and then the speed of the second vehicle is matched with the speed of the first vehicle. In various embodiments, the speed of the second vehicle is based on a difference in position between the first and second vehicles (position delta), and the second vehicle speed has a base value (based on the speed of the first vehicle) and a speed delta value proportional to the position delta such that as the position delta decreases the speed delta value decreases with corresponding decrease of the second vehicle speed.

In some examples, the positional output characteristic of the first vehicle may include global positioning system (GPS) coordinates of the first vehicle. The kinematic output characteristic of the first vehicle may include a yaw rate of the first vehicle, in various examples. According to various embodiments, the guidance controller may be configured to integrate the yaw rate of the first vehicle to obtain the heading of the first vehicle. In one example, the first communication frequency is approximately 1 Hz for relay of the positional output characteristic. The second communication frequency that is greater than the first communication frequency, is approximately 10 Hz in one embodiment, to facilitate a higher resolution relay of kinematic information for the determination of heading, heading change or the like and corresponding deviations in heading between the first and second vehicles. Other communication frequencies may be used without departing from the scope of the present subject matter.

In agricultural systems, a cart and tractor may approach and follow a combine during harvest of a crop, and the cart may be used to collect the harvested crop from the combine, while the tractor pulls the cart away to deposit the harvested crop. In some examples, the tractor leads the combine if the grain cart is long enough. The present subject matter provides a system for communication between the combine (or first vehicle) and the tractor/cart (or second vehicle) in which a first portion of data is sent at a first frequency and the second portion of data is sent at a second frequency to minimize latency and provide a high-fidelity indication of travel by the first vehicle to the second vehicle. In various embodiments, no commands are communicated during the communication, rather position and kinematics information. Thus, the present system provides for localized control of heading and speed on the second vehicle (e.g., generated at the second vehicle or the associated system) with transmitted position and kinematics from the first vehicle. Propulsion and steering commands may be generated on the second vehicle (e.g., the tractor) that is to be guided, and no steering commands are communicated from the first vehicle (e.g., the combine), in various embodiments.

In various examples, heading control based on yaw rate (from the first vehicle) and integration of yaw rate from the first vehicle are used to obtain a first vehicle heading. The second vehicle compares second vehicle heading with the integrated first vehicle yaw rate (or first vehicle heading) to determine a heading deviation and control the second vehicle based on the deviation, in various examples.

A detected user input to steering or propulsion control of the second vehicle may interrupt use of the guidance heading of the second vehicle by the driving elements of the second vehicle, in some embodiments. In some examples, a user-initiated deviation from the present sync command, such as a user steering deviation, causes arresting of the propulsion and steering syncing. In some examples, a user-initiated acceleration deviation causes arresting of propulsion syncing between the second vehicle and the first vehicle. In some examples, a user-initiated braking deviation causes arresting of propulsion syncing between the second vehicle and the first vehicle, in effect disengaging the sync control. The user may reengage sync control, e.g., by using a designated switch located on the second vehicle, in one example.

The present subject matter provides for communications between a first vehicle and a second vehicle using a novel communication protocol, including a low frequency message from the first vehicle with position data of the first vehicle and a higher frequency message from the first vehicle with kinematic data of the first vehicle, in various embodiments. In some examples, the kinematic data may include yaw rate and speed of the first vehicle. The kinematic data may optionally include heading data (e.g., yaw) of the first vehicle, in some embodiments. In various examples, a welcome message may be periodically sent from the first vehicle to the second vehicle to initiate syncing between the first vehicle and the second vehicle. In some examples, the first vehicle may send a message to the second vehicle requesting position data of the second vehicle.

The system may link a unique machine identification number (ID) to a ratio index to associate messages from that machine to its unique machine ID, in various embodiments. In some examples, a combine (first vehicle) model number may be provided to the second vehicle, and the second vehicle may use the model number to look up combine dimensions, such as auger length, axle-to-axle position, etc. The first vehicle may provide GPS coordinates and/or real time kinematics (RTK) to the second vehicle, in various examples. In some examples, a synchronization (sync) mode may include commands that instruct the second vehicle to run at a static speed and then the combine (first vehicle) may adjust speed to fill up portions of the cart (towed by the second vehicle) to fill up unfilled portions of the cart. Thus, the commands can fine tune the position of the cart relative to the auger of the combine (e.g., nudge the cart to a position to fill unfilled portions of the cart).

In various examples, the second vehicle may integrate yaw rate of the first vehicle (to determine heading) and compare the obtained value with a heading of the second vehicle to obtain a deviation value that may be used to control the second vehicle (to turn in correspondence with the first vehicle). The present system communicates the yaw rate of the combine (or first vehicle) in addition to heading of the combine because the messages between the vehicles are not at a fixed timing, and to compensate for late or missing messages the yaw rate may be used to propagate heading and position forward, in various examples. In some examples, the present system indexes times to the position data provided by the first vehicle so that position can be updated based on time (i.e., at 300 msec, 400 msec, etc.). In various embodiments, a y-position difference between the first vehicle and the second vehicle is used to determine speed of the second vehicle, and a yaw rate (or integrated yaw rate) difference between the first vehicle and the second vehicle is used to determine steering control of the second vehicle.

In some embodiments, three types of input are sent from the first vehicle (e.g., combine) to the second vehicle (e.g., tractor), including position data, kinematic data (such as yaw, yaw rate or the like), and a sync offset or sync mode command. The second vehicle is optionally not controlled based on speed. Instead, the second vehicle is controlled based on position relative to the first vehicle, in various embodiments, and in other embodiments position and speed of the first vehicle. In other words, the first vehicle controls speed and heading of the first vehicle and the second vehicle generates its own control instructions that approach and work cooperatively with the first vehicle using the provided position data and heading/yaw data received from the first vehicle.

The combine (or first vehicle) includes a control unit (SC1) that is the guidance source for the system to provide three-dimensional (3D) compensated position and high-resolution yaw rate to a communication unit (RCU), which will then forward the data over the air to other vehicles, in various embodiments. An application, referred to as a harvest assist application (app), provides a user interface on the first vehicle and displays status (sync status, errors, etc.), and accepts or pushes low latency commands/data (nudge, speed lock, save sync point, etc.) from the first vehicle to the second vehicle through the communication unit. In some embodiments, a module between a low latency channel and a high latency channel decides via an identification on the message or dictionary which radio communication will be used to send the data. A control unit handles low latency data (position and operational commands) from the second vehicle to the first vehicle and vice versa, and is configured from its own pool, in various embodiments. A connectivity module (or field hub) may be used to handle high latency communications, including but not limited to fill level, field coverage, field definition and boundaries, and stage/unload requests, in various embodiments.

The tractor/cart (or second vehicle) includes a control unit (SC1) that functions as the navigation controller and when performing sync operations uses a sync guidance mode, in various examples. The sync guidance mode uses a received external vehicle position reference to calculate errors and control steering and/or propulsion of the second vehicle, in some examples. The sync guidance mode may be changed if automation is not active, in various embodiments. The harvest assist app includes a user interface for the second vehicle, a cart/harvest configuration hub, and a guidance controller (as it can send vectors and switch SC1 guidance modes). The harvest assist app may provide the guidance controller such as a guidance line generator, a user interface that provides a visual representation of relative position of the first and second vehicles, display status, errors, and configuration pages, and a means for storing and publishing configuration data (sync window, cart geometry, etc.). A communication control unit (RCU) handles low latency data (position and operational commands) from the second vehicle to the first vehicle and vice versa, and is configured from its own pool, in various embodiments.

In various embodiments, the present system communicates position data from the first vehicle to the second vehicle at a first communication frequency (such as 1, 5 or 10 Hz) and communicates kinematic data from the first vehicle to the second vehicle at a second communication frequency that is greater than the first frequency (such as 5, 10, 20, 100 Hz or the like). Other communication frequencies may be used without departing from the scope of the present subject matter. The kinematic data provides an enhanced indication of the first vehicle movement and as described herein, facilitates cooperative movement of the second vehicle. Additionally, the present system minimizes bandwidth needed for communication between the first and second vehicles. The system may use position of the first vehicle front axle as a reference point relative to a rear axle of the second vehicle, in some embodiments. In some examples, an x-offset based on an auger length of the combine (first vehicle) is applied to distance calculations. In some examples, a y-offset based on a length of the cart towed by the tractor (second vehicle) is applied to distance calculations. In various examples, the position data communicated from the first vehicle to the second vehicle includes more bits of data than the kinematic data communicated from the first vehicle to the second vehicle. The control unit on the second vehicle may calculate time since the last communication of location data (time delta) and use the calculated time to convert speed to distance traveled by the first vehicle, in various embodiments.

The present system uses communications from the first vehicle to the second vehicle to provide data regarding first vehicle position and kinematics, instead of providing control commands from the first vehicle to the second vehicle. Thus, the second vehicle controls steering and propulsion of the second vehicle to sync with the first vehicle based on the received data without requiring commands from the first vehicle. The present system utilizes low latency, short range communications between the vehicles to optimize steering performance, in various embodiments.

In various embodiments, the second vehicle integrates the received yaw rate of the first vehicle per time to obtain a heading of the first vehicle, and compares the heading of the first vehicle to the heading of the second vehicle to obtain an input for steering control of the second vehicle. The second vehicle may obtain a y-track error using a proportional derivative, in some embodiments. The system provides for a user adjustable maximum speed, in some embodiments. The speed of the second vehicle may be governed in tight curves, such as by using a g-force limiter, in various examples. In some examples, a curvature offset is used in addition to the heading comparison for steering control. The first vehicle and second vehicle will sync if heading difference between the first vehicle and second vehicle is within a heading threshold, such as 70, 90, 110 degrees or the like, in some examples.

In various examples, curvature compensation is included to guide the second vehicle. For example, in some situations a synchronization point location for the second vehicle and a commanded second vehicle speed need to be compensated when the first vehicle is driving a non-zero curvature path. According to various examples, the present system utilizes an algorithm that synchronizes the yaw rate of both the first vehicle and the second vehicle about the synchronization point with respect to the first vehicle curvature. In one example, where YSyncOffeset=0, and XSyncOffset=4 m, the following calculations are applied:

FirstVehicleYawRate(measured)/FirstVehicleSpeed (measured)=FirstVehicleCurvature, Second VehicleTargetCurvature=1/[(1/FirstVehicleCurvature)+XSyncOffset+ySyncOffseContribution], Second VehicleTargetSpeed=FirstVehicleYawRate (measured)/SecondVehicleTargetCurvature.

In one example, with a left-hand mounted spout on the first vehicle (e.g., a harvester), the XSyncOffset is subtracted when the first vehicle is turning left. In another example, when the YSyncOffset is non-zero, a geometrical equation is used to solve for the addition curvature offset of the Y component. To account for implement drift induced by the first vehicle turning, additional geometrical equations may be used to model the implement drift behavior, and thereby optimize the solution further, in various examples.

The present system provides a highly accurate mechanism to determine not only the position, but also heading of a first vehicle and then use that information in combination with the position and heading of the second vehicle to permit cooperative autonomous operation between the first and second vehicles.

The present subject matter provides a control system that guides one or more second (companion) vehicles based on information received from one or more first vehicles. In various embodiments, the first vehicle includes, but is not limited to, a prime mover such as a combine, tractor, sprayer, vehicle and implement train or the like. In various embodiments, the second vehicle includes, but is not limited to, a tractor with a grain cart, a second combine, a sprayer, a baler or the like. In some embodiments, the control system may be used to cooperatively operate a plurality of combines. For instance, in a field conducting harvesting with two or more combines this system could be used to cooperatively control a following combine relative to the position/heading of a leading combine.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 3A-3B are listings of communications between the first vehicle and second vehicle, according to various embodiments.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Figure 1:
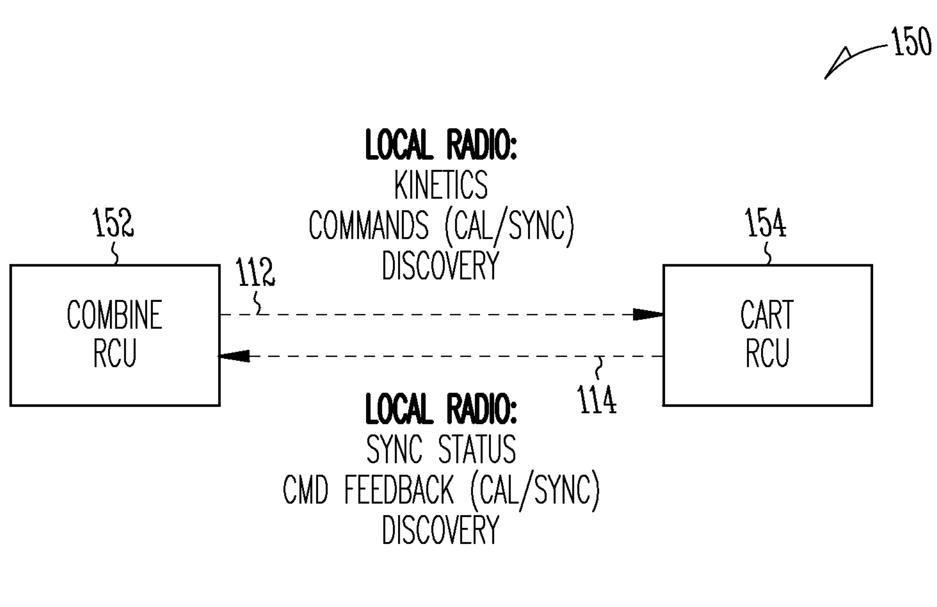
FIG. 1 is a schematic diagram of one example of communication between a first vehicle and a second vehicle.

FIG. 1 is a schematic diagram of one example a system 150 of communication between a first vehicle 152 (e.g., combine, sprayer, mower or the like) and a second vehicle 154 (e.g., tractor with a grain cart, second combine, sprayer, baler or the like). A communication control unit (RCU) handles low latency data (position and operational commands) from the second vehicle to the first vehicle and vice versa, and is configured from its own pool, in various embodiments.

In various embodiments, the present system 150 communicates position data from the first vehicle to the second vehicle using local radio 112 at a first communication frequency (such as 1, 5 or 10 Hz) and communicates kinematic data from the first vehicle to the second vehicle at a second communication frequency that is greater than the first frequency (such as 5, 10, 20, 100 Hz or the like). Other communication frequencies may be used without departing from the scope of the present subject matter. The kinematic data provides an enhanced indication of the first vehicle movement and as described herein, facilitates cooperative movement of the second vehicle. Additionally, the present system minimizes bandwidth needed for communication between the first and second vehicles. The second vehicle 154 communicates using local radio 114 to send sync status and command feedback information to the first vehicle 152, in various examples.

The present subject matter provides a control system that guides one or more second (companion) vehicles based on information received from one or more first vehicles. In various embodiments, the first vehicle 152 includes, but is not limited to, a prime mover such as a combine, tractor, sprayer, vehicle and implement train or the like. In various embodiments, the second vehicle 154 includes, but is not limited to, a tractor with a grain cart, a second combine, a sprayer, a baler or the like). In some embodiments, the control system may be used to cooperatively operate a plurality of combines. For instance, in a field conducting harvesting with two or more combines this system could be used to cooperatively control a following combine relative to the position/heading of a leading combine.

Figure 2:
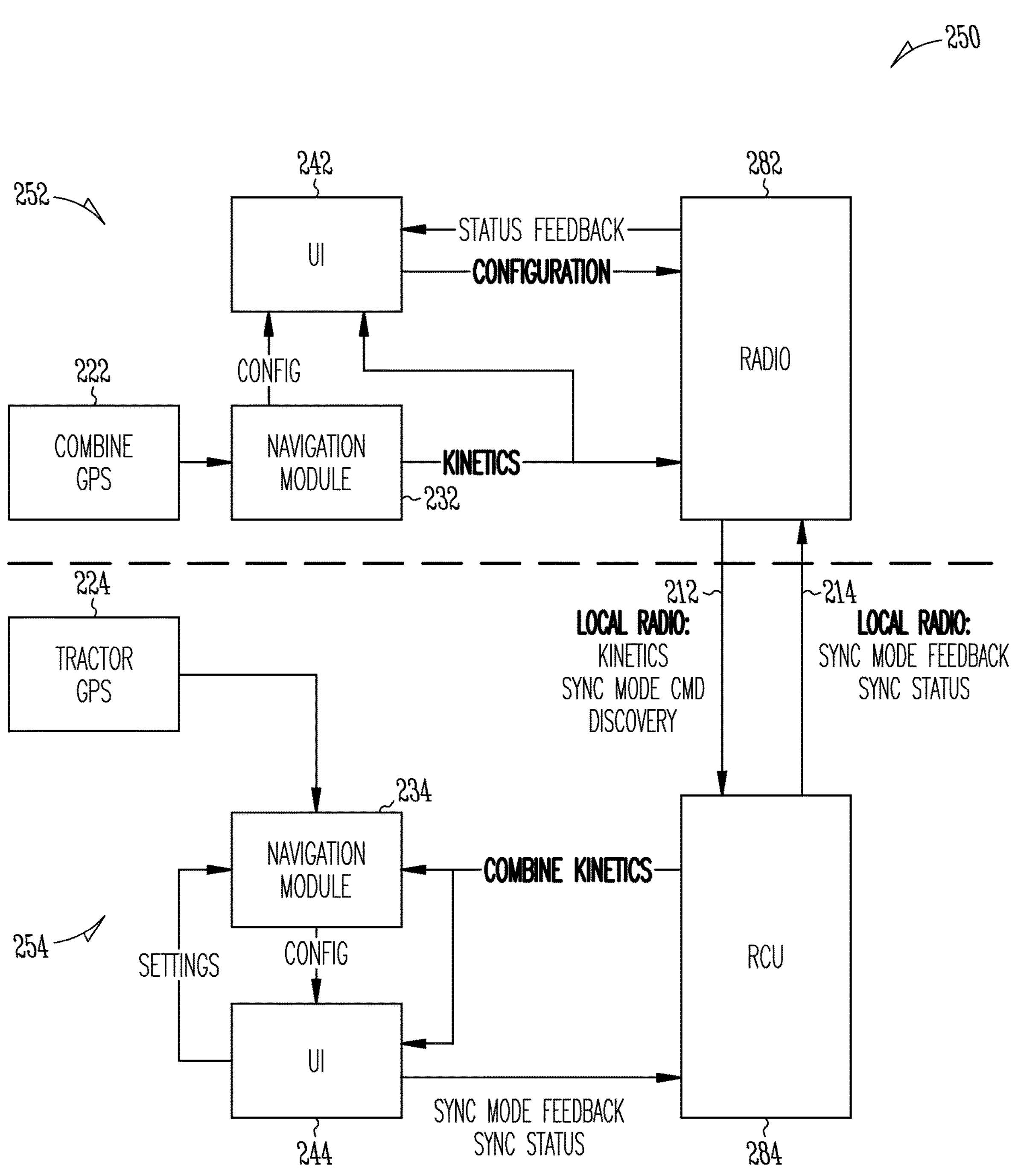
FIG. 2 is a schematic diagram of one example of a system for syncing a second vehicle with a first vehicle, according to various embodiments.

FIG. 2 is a schematic diagram of one example of a system 250 for syncing a second vehicle 254 with a first vehicle 252, according to various embodiments. In some embodiments, three types of input are sent from the first vehicle to the second vehicle, including position data, kinematic data (such as yaw, yaw rate or the like), and a sync offset or sync mode command. The second vehicle 254 is optionally not controlled based on speed. Instead, the second vehicle 254 is controlled based on position relative to the first vehicle 252, in various embodiments, and in other embodiments the second vehicle 254 is controlled with a combination of position and speed of the first vehicle 252. In other words, the first vehicle 252 controls its speed and heading and the second vehicle 254 controls its driving using the provided position data and heading/yaw data received from the first vehicle 252.

In various embodiments, the first vehicle 252 includes, but is not limited to, a prime mover such as a combine, tractor, sprayer, vehicle and implement train or the like. In various embodiments, the second vehicle 254 includes, but is not limited to, a tractor with a grain cart, a second combine, a sprayer, a baler or the like.

The first vehicle 252 includes a control unit (SC1) or module 232 that is the guidance source for the system to provide three-dimensional (3D) compensated position (including National Marine Electronics Association (NMEA) format GPS data from a GPS unit 222, or NMEA data) and high-resolution yaw rate (YAW data) to a communication unit (RCU) 282, which will then forward the data 212 over the air to other vehicles, in various embodiments, such as one or more second vehicles 254. An application, referred to as a harvest assist application (app), provides a user interface 242 on the first vehicle and displays status (sync status, errors, etc.), and accepts or pushes low latency commands/data (nudge, speed lock, save sync point, etc.) from the first vehicle to the second vehicle through the communication unit. In some embodiments, a module between a low latency channel and a high latency channel decides via an identification on the message or dictionary which radio communication will be used to send the data. A control unit handles low latency data (position and operational commands) from the second vehicle to the first vehicle and vice versa, and is configured from its own pool, in various embodiments. A connectivity module (or field hub) may be used to handle high latency communications, including but not limited to vehicle fill level, vehicle coverage, field definition and boundaries, and stage/unload requests, in various embodiments.

The second vehicle 254 includes a control unit (SC1) or module 234 that functions as the navigation controller and when performing sync operations uses a sync guidance mode, in various examples. The sync guidance mode uses a received external vehicle position reference such as from GPS unit 224 to calculate errors and control steering and/or propulsion of the second vehicle, in some examples. In an example, the sync guidance mode may be changed if automation is not active, in various embodiments. The harvest assist app includes a user interface 244 for the second vehicle, a configuration hub, and a guidance controller (as it can send vectors and switch SC1 guidance modes). The harvest assist app may provide the guidance controller such as a guidance line generator, a user interface 244 that provides a visual representation of first vehicle and second vehicle relative position, display status, errors, and configuration pages, and a means for storing and publishing configuration data (sync window, cart geometry, etc.). A communication control unit (RCU) 284 handles low latency data 214 (position and operational commands) from the second vehicle to the first vehicle and vice versa, and is configured from its own pool, in various embodiments.

Figure 3A:
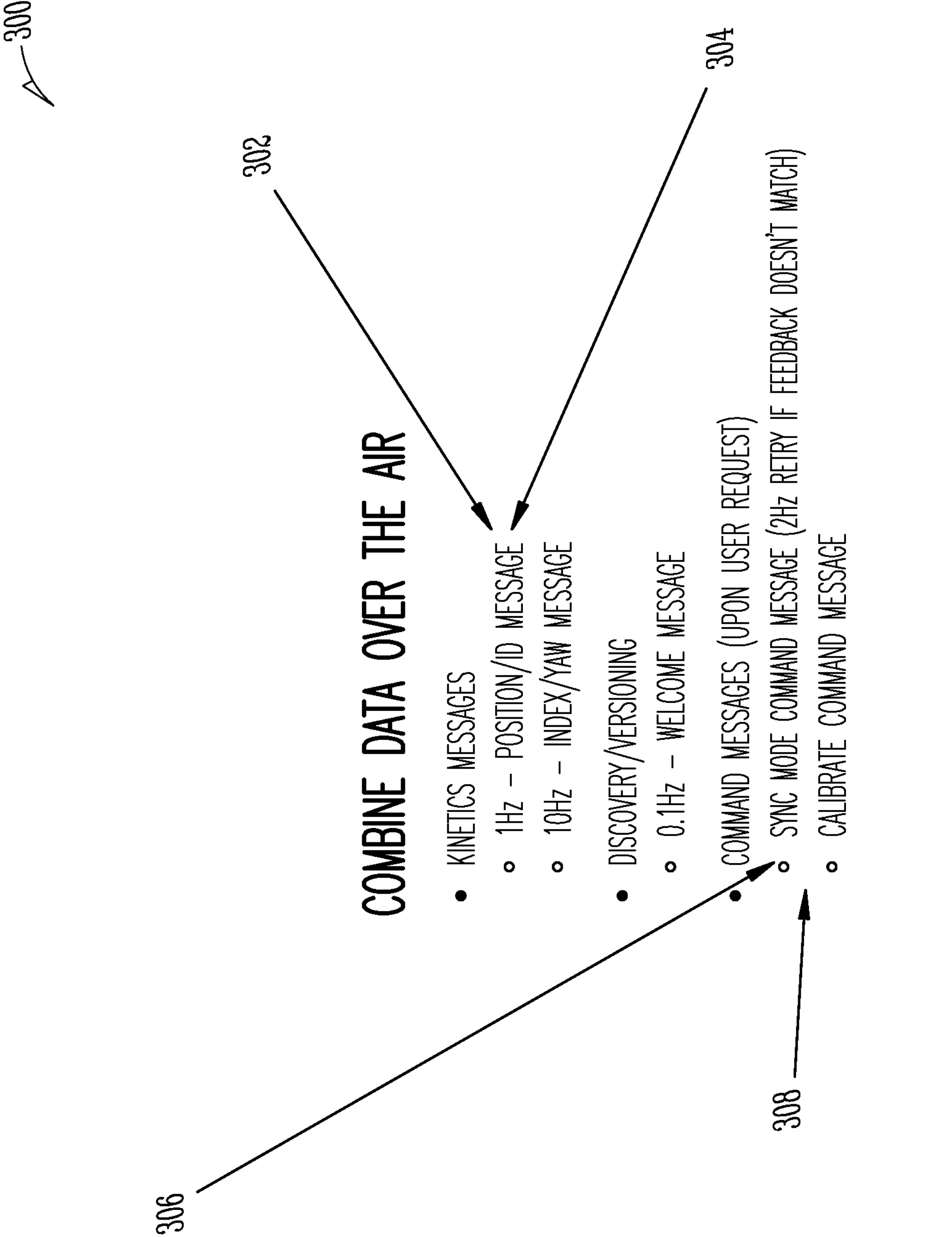

FIGS. 3A-3B are listings of communications 300 between the first vehicle and second vehicle, according to various embodiments. The present subject matter provides for communications between a first vehicle and a second vehicle using a novel communication protocol, including a low frequency message from the first vehicle with position data of the first vehicle and a higher frequency message from the first vehicle with kinematic data of the first vehicle, in various embodiments. In some examples, the kinematic data may include yaw rate and speed of the first vehicle. The kinematic data may optionally include heading data (e.g., yaw) of the first vehicle, in some embodiments. In various examples, a welcome message may be periodically sent from the first vehicle to the second vehicle to initiate syncing between the first vehicle and the second vehicle. In some examples, the first vehicle may send a message to the second vehicle requesting position data of the second vehicle.

The system may link a unique machine identification number (ID) to a ratio index to associate messages from that machine to its unique machine ID, in various embodiments. In some examples, a combine (first vehicle) model number may be provided to the second vehicle, and the second vehicle may use the model number to look up combine dimensions, such as auger length, axle-to-axle position, etc. The first vehicle may provide GPS coordinates and/or real time kinematics (RTK) to the second vehicle, in various examples. In some examples, a synchronization (sync) mode may include commands that instruct the second vehicle to run at a static speed and then the combine (first vehicle) may adjust speed to fill up portions of the cart (towed by the second vehicle) to fill up unfilled portions of the cart, at 306. Thus, the commands can fine tune the position of the cart relative to the auger of the combine (e.g., nudge the cart to a position to fill unfilled portions of the cart), at 308.

In various examples, the second vehicle may integrate yaw rate of the first vehicle (to determine heading) and compare the obtained value with a heading of the second vehicle to obtain a deviation value that may be used to control the second vehicle (to turn in correspondence with the first vehicle). At 304, the present system communicates the yaw rate of the combine (or first vehicle) in addition to heading of the combine because the messages between the vehicles are not at a fixed timing, and to compensate for late or missing messages the yaw rate may be used to propagate heading and position forward, in various examples. In some examples, the present system indexes times to the position data provided by the first vehicle so that position can be updated based on time (i.e., at 300 msec, 400 msec, etc.), at 302. In various embodiments, a y-position difference between the first vehicle and the second vehicle is used to determine speed of the second vehicle, and a yaw rate (or integrated yaw rate) difference between the first vehicle and the second vehicle is used to determine steering control of the second vehicle.

In some embodiments, three types of input are sent from the first vehicle (e.g., combine) to the second vehicle (e.g., tractor), including position data, kinematic data (such as yaw, yaw rate or the like), and a sync offset or sync mode command. In various embodiments, the first vehicle controls speed and heading of the first vehicle and the second vehicle generates its own control instructions that approach and work cooperatively with the first vehicle using the provided position data and heading/yaw data received from the first vehicle. The second vehicle (e.g., tractor) may communicate data 350 including a status message 352, a discovery/versioning message 354, and a command feedback message 356, in various examples.

Figure 4:
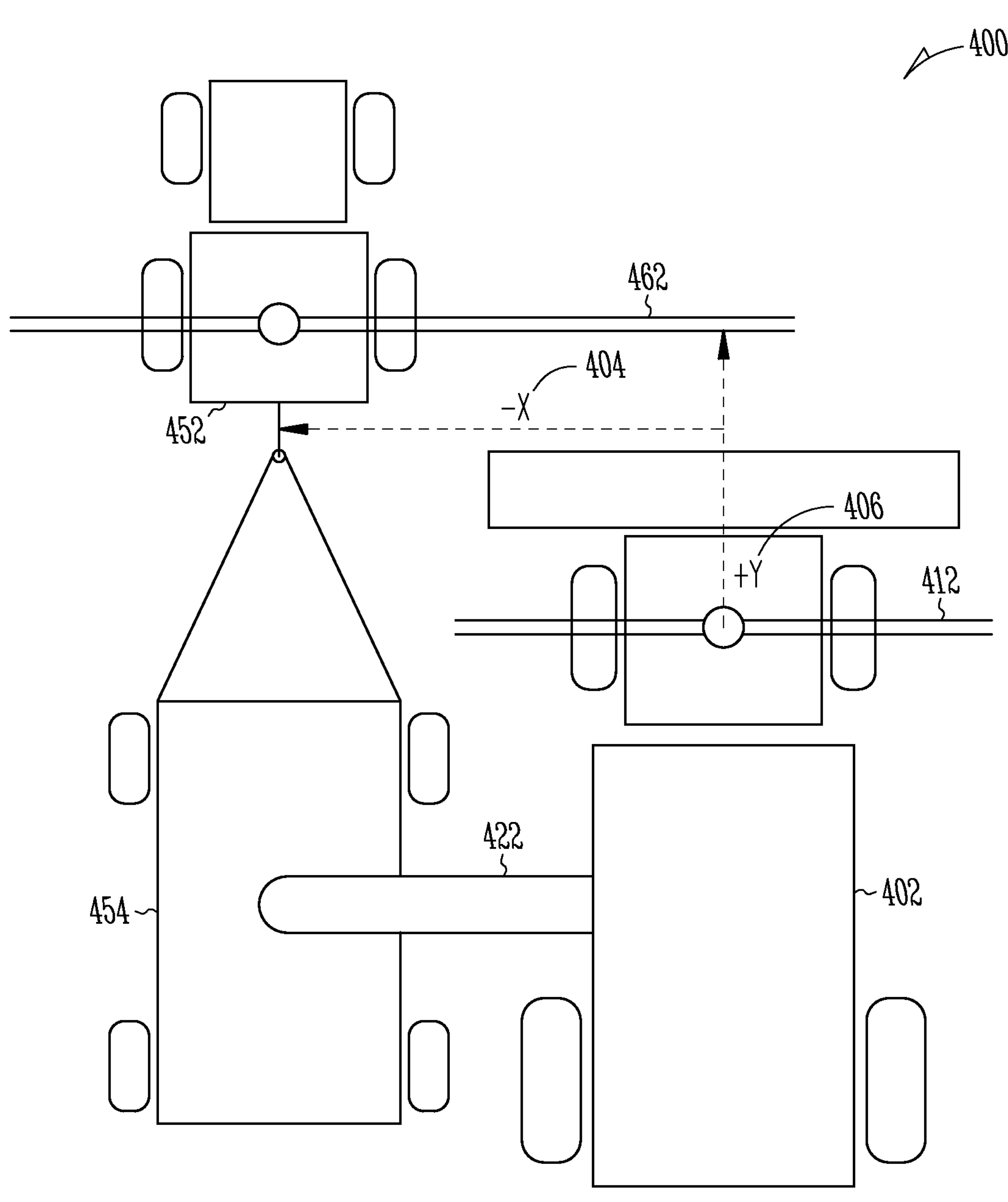
FIG. 4 is a block diagram of one example of coordinates used for syncing a second vehicle with a first vehicle, according to various embodiments.

FIG. 4 is a block diagram of one example of coordinates used for syncing a second vehicle with a first vehicle, according to various embodiments. The system 400 may use position of the first vehicle 402 (e.g., a combine) front axle 412 as a reference point relative to a rear axle 462 of the second vehicle 452 (e.g., a tractor), in some embodiments. In some examples, an x-offset 404 based on an auger 422 length of the combine is applied to distance calculations. In some examples, a y-offset 406 based on one or more of a length of the implement 454 towed by the second vehicle (e.g., a grain cart), first vehicle dimensions or the like applied to distance calculations. In various examples, the position data communicated from the first vehicle 402 to the second vehicle 452 includes more bits of data than the kinematic data communicated from the first vehicle to the second vehicle. The control unit on the second vehicle 452 may calculate time since the last communication of location data (time delta) and use the calculated time to convert speed to distance traveled by the first vehicle 402, in various embodiments. In another example, the yaw data is optionally indexed to derived positions between intervening position transmissions at the lower frequency. For instance, if position is transmitted at 0 and 1 seconds (e.g., corresponding to a frequency of 1 Hz) the yaw rate transmitted every 0.1 second (corresponding to a frequency of 10 Hz) is indexed to derived positions based on the 0 and 1 second positions (e.g., the intervening positions are mathematically determined).

In various embodiments, a y-position 406 difference between the first vehicle 402 and second vehicle 452 is used to determine speed of the second vehicle, and a yaw rate (or integrated yaw rate) difference between the first vehicle and second vehicle is used to determine steering control of the second vehicle. In various examples, the difference in position between the first vehicle and the second vehicle may be used to control speed of the second vehicle. For instance, the greater the difference in position between the first vehicle and the second vehicle, the greater the speed input to the driving elements of the second vehicle. In one example, if the position of the second vehicle is relatively close to the first vehicle, the second vehicle will be controlled to approach the first vehicle at a lesser speed until the second vehicle reaches the desired position with respect to the first vehicle, and then the speed of the second vehicle is matched with the speed of the first vehicle. In various embodiments, the speed of the second vehicle is based on a difference in position between the first and second vehicles (position delta), and the second vehicle speed has a base value (based on the speed of the first vehicle) and a speed delta value proportional to the to the position delta such that as the position delta decreases the speed delta value decreases. In some examples, the positional output characteristic of the first vehicle may include global positioning system (GPS) coordinates of the first vehicle.

Figure 5:
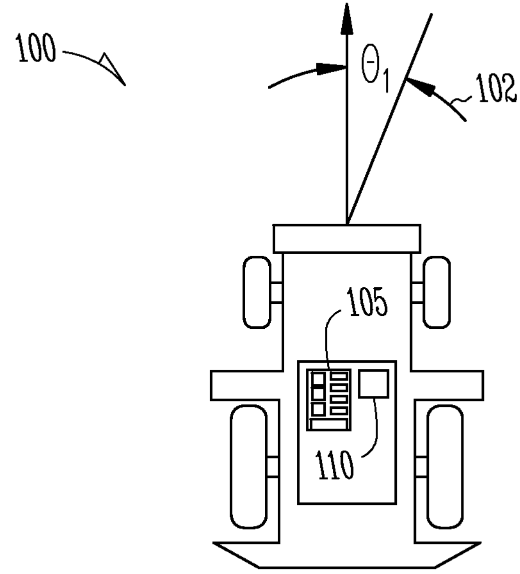
FIG. 5 is a schematic diagram of one example of a first vehicle and a second vehicle in a field, according to various embodiments.
Figure 5:
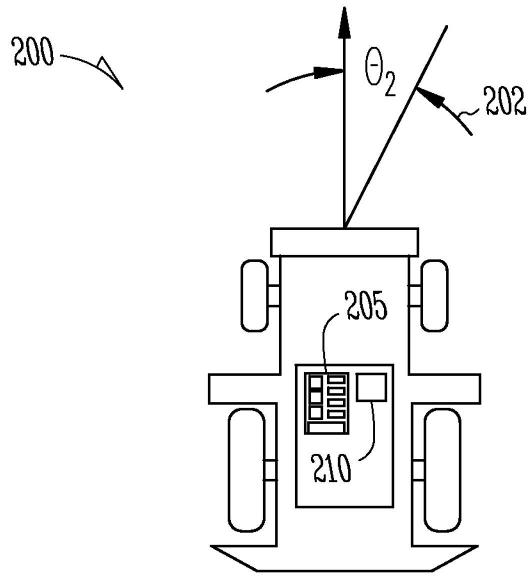

FIG. 5 illustrates a schematic diagram of one example of a first vehicle (or first machine) 100 and a second vehicle (or second machine) 200 in a field, according to various embodiments. The first vehicle 100 and the second vehicle 200 may include one or more angular or inertial sensors that is configured to generate data that is useful for measuring or determining the orientation or yaw rate of an agricultural vehicle.

The first vehicle 100 and second vehicle 200 includes, in various examples, any agricultural machine that is provided to perform a task such as processing a field. In some examples, the first vehicle 100 includes a vehicle controller 105, and sensors 110. In some examples, the second vehicle 200 includes a vehicle controller 205, and sensors 210. The vehicle controllers 105, 205 include, in various examples, one or more hardware circuits or software applications that are configured to control the operation of the vehicles 100, 200, such as by generating a guidance vector (direction and speed) and automatically steering the vehicle according to the guidance vector and input received from one or more of the sensors 110, 210. The sensors 110, 210 include, in various examples, any of the position, orientation, behavioral, or other sensors described herein. Optionally, the sensors 110, 210 include vehicle parameter sensors as described herein (e.g., to monitor one or more vehicle parameters including, but not limited to, dynamic loads, orientation, oscillation, vibration, moments, inertia, forces or the like).

In some embodiments, three types of input are sent from the first vehicle 100 (e.g., combine, mower, sprayer, cultivator or the like) to the second vehicle 200 (e.g., tractor with a grain cart, baler, sprayer, cultivator or the like), including position data, kinematic data (such as yaw 102, yaw rate or the like), and a sync offset or sync mode command. In various embodiments, the sync offset or sync mode command ensure that the second vehicle does not collide with the first vehicle. In some embodiments, the sync offset or sync mode command more accurately positions cooperating components of the first and second vehicles so they work together (e.g., cart is positioned relative to the auger spout, spray boom of second vehicle is positioned to minimize double coverage of the spray boom of the first vehicle, baler picks up mowed hay left by mower, etc.).

The second vehicle is optionally not controlled based on speed. Instead, the second vehicle is controlled based on position relative to the first vehicle, in various embodiments, and in other embodiments the second vehicle is controlled with a combination of position and speed of the first vehicle. In other words, the first vehicle controls its speed and heading and the second vehicle controls its driving using the provided position data and heading/yaw data received from the first vehicle.

The system includes a first input to receive a positional output characteristic of a first vehicle 100 at a first communication frequency (such as 1, 5 or 10 Hz) and a second input to receive a kinematic output characteristic (such as yaw 102) of the first vehicle at a second communication frequency (such as 5, 10, 20, 100 Hz or the like), where the second communication frequency is greater than the first communication frequency. Other communication frequencies may be used without departing from the scope of the present subject matter. The kinematic data provides an enhanced indication of the first vehicle movement and as described herein, facilitates cooperative movement of the second vehicle. Additionally, the present system minimizes bandwidth needed for communication between the first and second vehicles.

A guidance controller of a second vehicle 200 is configured to process the kinematic output characteristic of the first vehicle to obtain a heading of the first vehicle, compare the heading of the first vehicle with a heading of the second vehicle to obtain a heading deviation of the second vehicle, and determine a guidance heading 202 of the second vehicle based on the heading deviation of the second vehicle. In various examples, the present system uses yaw rate of the first vehicle to propagate the heading of the first vehicle over time, and to improve response times of the system. In some examples, the yaw rate may be used to determine direction of the first vehicle over time, beyond a snapshot of the heading. In one example, the guidance heading when implemented turns the second vehicle in a manner that approaches and then corresponds with the heading of the first vehicle. In another example, the guidance heading may correspond to the heading deviation including a portion of the heading deviation (for a gradual approach), the full heading deviation (for a rapid approach), or a graduated value that includes a rapid approach that transitions to a gradual approach to correspond with the first vehicle heading. In yet another example, the guidance heading is used as a target value to guide the second vehicle toward a heading that corresponds with the heading of the first vehicle.

In various embodiments, the system is configured to use the positional output characteristic of the first vehicle to obtain a position of the first vehicle, and compare the position of the first vehicle to a position of the second vehicle to obtain a position deviation of the second vehicle. According to various embodiments, the system is configured to determining an approach speed of the second vehicle based on the position deviation of the second vehicle, and communicate the approach speed of the second vehicle to the one or more of steering, throttle or brake elements of the second vehicle.

Figure 6:
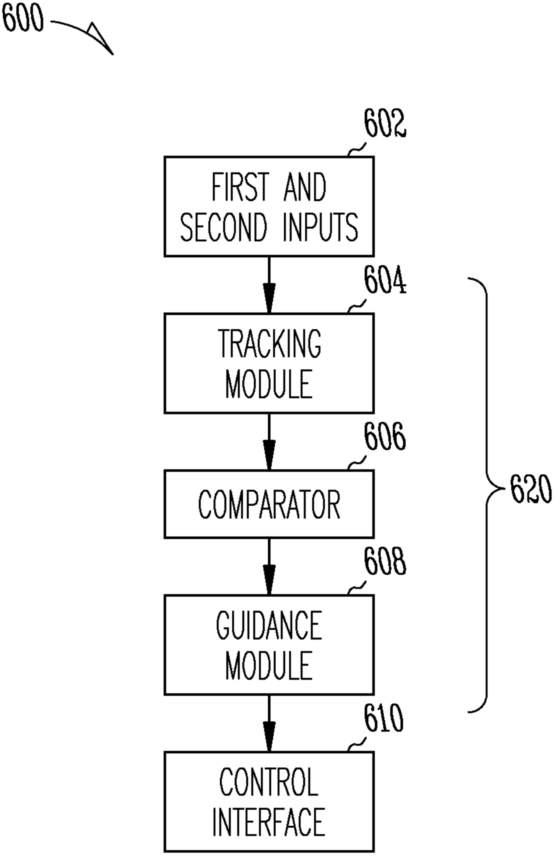
FIG. 6 is a block diagram of one example of a control system configured for guiding at least a second vehicle of a vehicle team.

FIG. 6 illustrates a block diagram of one example of a control system configured for guiding at least a second vehicle of a vehicle team. In various embodiments, the control system includes first and second input 602, the first input configured to receive a positional output characteristic of a first vehicle at a first communication frequency, and the second input configured to receive a kinematic output characteristic of the first vehicle at a second communication frequency, wherein the second communication frequency is greater than the first communication frequency. A guidance controller 620 (such as SC1 in FIG. 2) of the second vehicle may be in communication with the first input and the second input. The guidance controller 620 may include a tracking module 604 configured to process the kinematic output characteristic of the first vehicle to obtain a heading of the first vehicle. The guidance controller 620 may also include a comparator 606 configured to compare the heading of the first vehicle with a heading of the second vehicle to obtain a heading deviation of the second vehicle. The guidance controller 620 may further include a guidance module 608 configured to determine a guidance heading of the second vehicle based on the heading deviation of the second vehicle. The system may further include a control interface 610 configured to communicate the guidance heading of the second vehicle to one or more of steering, throttle or brake elements of the second vehicle. In some embodiments, the method includes processing, by the guidance controller of the second vehicle, the kinematic output characteristic and the positional output characteristic of the first vehicle to obtain a position and heading of the first vehicle, comparing, by the guidance controller of the second vehicle, the position and heading of the first vehicle with a position and heading of the second vehicle to obtain a heading deviation and a position deviation of the second vehicle, and determining, by the guidance controller of the second vehicle, a guidance heading of the second vehicle based on the heading deviation and the position deviation of the second vehicle.

In various embodiments, the tracking module 604 may be configured to use the positional output characteristic of the first vehicle to obtain a position of the first vehicle, and the comparator 606 may be configured to compare the position of the first vehicle to a position of the second vehicle to obtain a position deviation of the second vehicle. The guidance module 608 may be configured to determine an approach speed of the second vehicle based on the position deviation of the second vehicle, and the control interface 610 may configured to communicate the approach speed of the second vehicle to the one or more of steering, throttle or brake elements of the second vehicle, in various embodiments.

Figure 7:
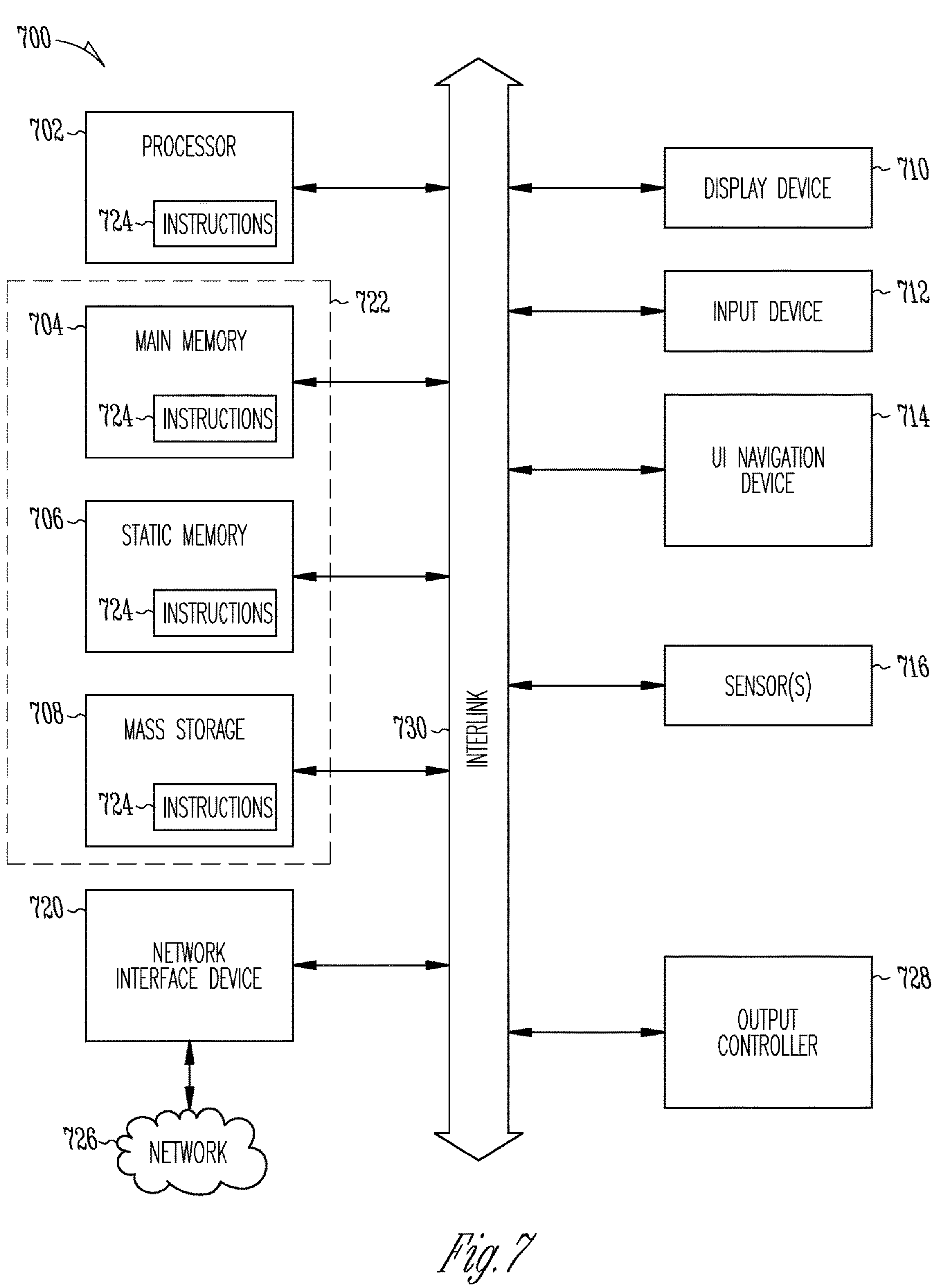
FIG. 7 is a block diagram of an example machine upon which any one or more of the techniques (e.g., methodologies) discussed herein can perform.

FIG. 7 illustrates a block diagram of an example machine 700 upon which any one or more of the techniques (e.g., methodologies) discussed herein can perform. Examples, as described herein, can include, or can operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 can operate as a standalone device or can be connected (e.g., networked) to other machines. In a networked deployment, the machine 700 can operate in the capacity of a server machine, a client machine, or both in server-client network environments. In an example, the machine 700 can act as a peer machine in peer-to-peer (P2P) (or other distributed) network environment. The machine 700 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 can include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drive, tape drive, flash storage, or other block devices) some or all of which can communicate with each other via an interlink (e.g., bus) 730. The machine 700 can further include a display unit 710, an alphanumeric input device 712 (e.g., a keyboard), and a user interface (UI) navigation device 714 (e.g., a mouse). In an example, the display unit 710, input device 712 and UI navigation device 714 can be a touch screen display. The machine 700 can additionally include a storage device (e.g., drive unit) 708, a network interface device 720, and one or more sensors 716, such as a global positioning system (GPS) sensor, compass, accelerometer, or other sensor. The machine 700 can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 can be, or include, a machine readable medium 722 on which is stored one or more sets of data structures or instructions 724 (e.g., software) embodying or utilized by any one or more of the techniques or functions described herein. The instructions 724 can also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 can constitute the machine-readable media 722. While the machine readable medium 722 is illustrated as a single medium, the term "machine readable medium" can include a single medium or multiple media (e.g., a centralized or distributed database, and/or associated caches and servers) configured to store the one or more instructions 724.

The term "machine readable medium" can include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media can include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 can be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, peer-to-peer (P2P) networks, among others. In an example, the network interface device 720 can include one or more physical jacks (e.g., Ethernet, coaxial, or phone jacks) or one or more antennas to connect to the communications network 726. In an example, the network interface device 720 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine-readable medium.

Various Notes and Aspects

Example 1 is a control system configured for guiding at least a second vehicle of a vehicle team, the control system comprising: a first input configured to receive a positional output characteristic of a first vehicle at a first communication frequency; a second input configured to receive a kinematic output characteristic of the first vehicle at a second communication frequency, wherein the second communication frequency is greater than the first communication frequency; a guidance controller of the second vehicle in communication with the first input and the second input, the guidance controller includes: a tracking module configured to process the kinematic output characteristic and the positional output characteristic of the first vehicle to obtain a position and heading of the first vehicle; a comparator configured to compare the position and heading of the first vehicle with a position and heading of the second vehicle to obtain a heading deviation and a position deviation of the second vehicle; and a guidance module configured to determine a guidance heading of the second vehicle based on the heading deviation and the position deviation of the second vehicle; and a control interface configured to communicate the guidance heading of the second vehicle to one or more of steering, throttle or brake elements of the second vehicle.

In Example 2, the subject matter of Example 1 optionally includes wherein the tracking module is configured to use the positional output characteristic of the first vehicle to obtain the position of the first vehicle, and wherein the comparator is configured to compare the position of the first vehicle to the position of the second vehicle to obtain the position deviation of the second vehicle.

In Example 3, the subject matter of Example 2 optionally includes wherein the guidance module is configured to determine an approach speed of the second vehicle based on the position deviation of the second vehicle, and wherein the control interface is configured to communicate the approach speed of the second vehicle to the one or more of steering, throttle or brake elements of the second vehicle.

In Example 4, the subject matter of any one or more of Examples 1-3 optionally includes wherein the positional output characteristic of the first vehicle includes global positioning system (GPS) coordinates of the first vehicle.

In Example 5, the subject matter of any one or more of Examples 1-4 optionally includes wherein the kinematic output characteristic of the first vehicle includes a yaw rate of the first vehicle.

In Example 6, the subject matter of Example 5 optionally includes wherein the guidance controller is configured to integrate the yaw rate of the first vehicle to obtain the heading of the first vehicle.

In Example 7, the subject matter of any one or more of Examples 1-6 optionally includes wherein the guidance controller includes an override module configured to override the communication of the guidance heading to the one or more of steering, throttle or brake elements upon detection of a user guidance input to the second vehicle.

In Example 8, the subject matter of any one or more of Examples 1-7 optionally includes wherein the first communication frequency is approximately 1 Hz.

In Example 9, the subject matter of any one or more of Examples 1-8 optionally includes wherein the second communication frequency is approximately Hz.

Example 10 is a system comprising: a guidance controller of a second vehicle, the guidance controller comprising a processor and a data storage device in communication with the processor, wherein the data storage device comprises instructions thereon that, when executed by the processor, causes the processor to: receive a positional output characteristic of a first vehicle at a first communication frequency; receive a kinematic output characteristic of the first vehicle at a second communication frequency, wherein the second communication frequency is greater than the first communication frequency; process the kinematic output characteristic and the positional output characteristic of the first vehicle to obtain a position and heading of the first vehicle; compare the position and heading of the first vehicle with a position and heading of the second vehicle to obtain a heading deviation and a position deviation of the second vehicle; determine a guidance heading of the second vehicle based on the heading deviation and the position deviation of the second vehicle; and transmit the guidance heading of the second vehicle to one or more of steering, throttle or brake elements of the second vehicle.

In Example 11, the subject matter of Example 10 optionally includes wherein the instructions further cause the processor to: use the positional output characteristic of the first vehicle to obtain the position of the first vehicle, and compare the position of the first vehicle to the position of the second vehicle to obtain the position deviation of the second vehicle.

In Example 12, the subject matter of Example 11 optionally includes wherein the instructions further cause the processor to: determine an approach speed of the second vehicle based on the position deviation of the second vehicle, and communicate the approach speed of the second vehicle to the one or more of steering, throttle or brake elements of the second vehicle.

In Example 13, the subject matter of any one or more of Examples 10-12 optionally includes wherein the positional output characteristic of the first vehicle includes global positioning system (GPS) coordinates of the first vehicle.

In Example 14, the subject matter of any one or more of Examples 10-13 optionally includes wherein the kinematic output characteristic of the first vehicle includes a yaw rate of the first vehicle.

In Example 15, the subject matter of Example 14 optionally includes wherein the guidance controller is configured to integrate the yaw rate of the first vehicle to obtain the heading of the first vehicle.

In Example 16, the subject matter of any one or more of Examples 10-15 optionally includes wherein a detected user input to steering or propulsion control of the second vehicle interrupts use of the guidance heading of the second vehicle by the driving elements of the second vehicle.

In Example 17, the subject matter of any one or more of Examples 10-16 optionally includes wherein the first communication frequency is approximately 1 Hz.

In Example 18, the subject matter of any one or more of Examples 10-17 optionally includes wherein the second communication frequency is approximately Hz.

Example 19 is a method for guiding a second vehicle of a vehicle team, the method comprising: receiving, by a guidance controller of the second vehicle, a positional output characteristic of a first vehicle at a first communication frequency; receiving, by the guidance controller of the second vehicle, a kinematic output characteristic of the first vehicle at a second communication frequency, wherein the second communication frequency is greater than the first communication frequency; processing, by the guidance controller of the second vehicle, the kinematic output characteristic and the positional output characteristic of the first vehicle to obtain a position and heading of the first vehicle; comparing, by the guidance controller of the second vehicle, the position and heading of the first vehicle with a position and heading of the second vehicle to obtain a heading deviation and a position deviation of the second vehicle; determining, by the guidance controller of the second vehicle, a guidance heading of the second vehicle based on the heading deviation and the position deviation of the second vehicle; and transmitting, by the guidance controller of the second vehicle, the guidance heading of the second vehicle to one or more of steering, throttle or brake elements of the second vehicle.

In Example 20, the subject matter of Example 19 optionally includes using the positional output characteristic of the first vehicle to obtain the position of the first vehicle, and comparing the position of the first vehicle to the position of the second vehicle to obtain the position deviation of the second vehicle.

In Example 21, the subject matter of Example 20 optionally includes determining an approach speed of the second vehicle based on the position deviation of the second vehicle, and communicating the approach speed of the second vehicle to the one or more of steering, throttle or brake elements of the second vehicle.

In Example 22, the subject matter of any one or more of Examples 19-21 optionally includes wherein the positional output characteristic of the first vehicle includes global positioning system (GPS) coordinates of the first vehicle.

In Example 23, the subject matter of any one or more of Examples 19-22 optionally includes wherein the kinematic output characteristic of the first vehicle includes a yaw rate of the first vehicle.

In Example 24, the subject matter of Example 23 optionally includes integrating, by the guidance controller of the second vehicle, the yaw rate of the first vehicle to obtain the heading of the first vehicle.

In Example 25, the subject matter of any one or more of Examples 19-24 optionally includes wherein the first communication frequency is approximately 1 Hz.

In Example 26, the subject matter of any one or more of Examples 19-25 optionally includes wherein the second communication frequency is approximately Hz.

Example 27 is at least one machine-readable medium including instructions that, when executed by processing circuitry, cause the processing circuitry to perform operations to implement of any of Examples 1-26.

Example 28 is an apparatus comprising means to implement of any of Examples 1-20.

Example 29 is a system to implement of any of Examples 1-26.

Example 30 is a method to implement of any of Examples 1-26.

Each of the non-limiting aspects or examples described herein may stand on its own or may be combined in various permutations or combinations with one or more of the other examples.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method aspects or examples described herein can be machine or computer-implemented at least in part. Some aspects or examples can include a computer-readable medium or machine-readable medium encoded with instructions operable to configure an electronic device to perform methods as described in the above aspects or examples. An implementation of such methods can include code, such as microcode, assembly language code, a higher-level language code, or the like. Such code can include computer readable instructions for performing various methods. The code may form portions of computer program products. Further, in an aspect or example, the code can be tangibly stored on one or more volatile, non-transitory, or non-volatile tangible computer-readable media, such as during execution or at other times. Aspects or examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A control system configured for guiding at least a second vehicle of a vehicle team, the control system comprising:

a first input configured to wirelessly receive a positional output characteristic of a first vehicle transmitted from the first vehicle at a first communication frequency;

a second input configured to wirelessly receive a kinematic output characteristic of the first vehicle transmitted from the first vehicle at a second communication frequency, wherein the second communication frequency is greater than the first communication frequency;

a guidance controller of the second vehicle in communication with the first input and the second input, the guidance controller includes:

a tracking module configured to process the kinematic output characteristic and the positional output characteristic of the first vehicle to obtain a position and heading of the first vehicle;

a comparator configured to compare the position and heading of the first vehicle with a position and heading of the second vehicle to obtain a heading deviation and a position deviation of the second vehicle; and a guidance module configured to determine a guidance heading of the second vehicle based on the heading deviation and the position deviation of the second vehicle; and a control interface configured to communicate the guidance heading of the second vehicle to one or more of steering, throttle or brake elements of the second vehicle.

2. The control system of claim 1, wherein the tracking module is configured to use the positional output characteristic of the first vehicle to obtain the position of the first vehicle, and wherein the comparator is configured to compare the position of the first vehicle to the position of the second vehicle to obtain the position deviation of the second vehicle.

3. The control system of claim 2, wherein the guidance module is configured to determine an approach speed of the second vehicle based on the position deviation of the second vehicle, and wherein the control interface is configured to communicate the approach speed of the second vehicle to the one or more of steering, throttle or brake elements of the second vehicle.

4. The control system of claim 1, wherein the positional output characteristic of the first vehicle includes global positioning system (GPS) coordinates of the first vehicle.

5. The control system of claim 1, wherein the kinematic output characteristic of the first vehicle includes a yaw rate of the first vehicle.

6. The control system of claim 5, wherein the guidance controller is configured to integrate the yaw rate of the first vehicle to obtain the heading of the first vehicle.

7. The control system of claim 1, wherein the guidance controller includes an override module configured to override the communication of the guidance heading to the one or more of steering, throttle or brake elements upon detection of a user guidance input to the second vehicle.

8. The control system of claim 1, wherein the first communication frequency is approximately 1 Hz.

9. The control system of claim 1, wherein the second communication frequency is approximately 10 Hz.

10. A system, comprising:

a guidance controller of a second vehicle, the guidance controller comprising a processor and a data storage device in communication with the processor, wherein the data storage device comprises instructions thereon that, when executed by the processor, causes the processor to:

wirelessly receive a positional output characteristic of a first vehicle transmitted from the first vehicle at a first communication frequency;

wirelessly receive a kinematic output characteristic of the first vehicle transmitted from the first vehicle at a second communication frequency, wherein the second communication frequency is greater than the first communication frequency;

process the kinematic output characteristic and the positional output characteristic of the first vehicle to obtain a position and heading of the first vehicle;

compare the position and heading of the first vehicle with a position and heading of the second vehicle to obtain a heading deviation and a position deviation of the second vehicle;

determine a guidance heading of the second vehicle based on the heading deviation and the position deviation of the second vehicle; and transmit the guidance heading of the second vehicle to one or more of steering, throttle or brake elements of the second vehicle.

11. The system of claim 10, wherein the instructions further cause the processor to:

use the positional output characteristic of the first vehicle to obtain the position of the first vehicle, and compare the position of the first vehicle to the position of the second vehicle to obtain the position deviation of the second vehicle.

12. The system of claim 11, wherein the instructions further cause the processor to:

determine an approach speed of the second vehicle based on the position deviation of the second vehicle, and communicate the approach speed of the second vehicle to the one or more of steering, throttle or brake elements of the second vehicle.

13. The system of claim 10, wherein the positional output characteristic of the first vehicle includes global positioning system (GPS) coordinates of the first vehicle.

14. The system of claim 10, wherein the kinematic output characteristic of the first vehicle includes a yaw rate of the first vehicle.

15. The system of claim 14, wherein the guidance controller is configured to integrate the yaw rate of the first vehicle to obtain the heading of the first vehicle.

16. The system of claim 10, wherein a detected user input to steering or propulsion control of the second vehicle interrupts use of the guidance heading of the second vehicle by the driving elements of the second vehicle.

17. The system of claim 10, wherein the first communication frequency is approximately 1 Hz.

18. The system of claim 10, wherein the second communication frequency is approximately 10 Hz.

19. A method for guiding a second vehicle of a vehicle team, the method comprising:

wirelessly receiving, by a guidance controller of the second vehicle, a positional output characteristic of a first vehicle transmitted from the first vehicle at a first communication frequency;

wirelessly receiving, by the guidance controller of the second vehicle, a kinematic output characteristic of the first vehicle transmitted from the first vehicle at a second communication frequency, wherein the second communication frequency is greater than the first communication frequency;

processing, by the guidance controller of the second vehicle, the kinematic output characteristic and the positional output characteristic of the first vehicle to obtain a position and heading of the first vehicle;

comparing, by the guidance controller of the second vehicle, the position and heading of the first vehicle with a position and heading of the second vehicle to obtain a heading deviation and a position deviation of the second vehicle;

determining, by the guidance controller of the second vehicle, a guidance heading of the second vehicle based on the heading deviation and the position deviation of the second vehicle; and transmitting, by the guidance controller of the second vehicle, the guidance heading of the second vehicle to one or more of steering, throttle or brake elements of the second vehicle.

20. The method of claim 19, further comprising:

using the positional output characteristic of the first vehicle to obtain the position of the first vehicle, and comparing the position of the first vehicle to the position of the second vehicle to obtain the position deviation of the second vehicle.

21. The method of claim 20, further comprising:

determining an approach speed of the second vehicle based on the position deviation of the second vehicle, and communicating the approach speed of the second vehicle to the one or more of steering, throttle or brake elements of the second vehicle.

22. The method of claim 19, wherein the positional output characteristic of the first vehicle includes global positioning system (GPS) coordinates of the first vehicle.

23. The method of claim 19, wherein the kinematic output characteristic of the first vehicle includes a yaw rate of the first vehicle.

24. The method of claim 23, further comprising:

integrating, by the guidance controller of the second vehicle, the yaw rate of the first vehicle to obtain the heading of the first vehicle.

25. The method of claim 19, wherein the first communication frequency is approximately 1 Hz.

26. The method of claim 19, wherein the second communication frequency is approximately 10 Hz.

* * * * *